United States Patent
Aggarwal et al.

(10) Patent No.: US 6,260,148 B1
(45) Date of Patent: Jul. 10, 2001

(54) METHODS AND SYSTEMS FOR MESSAGE FORWARDING AND PROPERTY NOTIFICATIONS USING ELECTRONIC SUBSCRIPTIONS

(75) Inventors: Sudhanshu M. Aggarwal, Bellevue; Peter L. Beebee, Redmond; Rajeev Surati, Seattle; Leon C. W. Wong, Redmond; Martin R. Calsyn, Carnation, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/360,531

(22) Filed: Jul. 26, 1999

Related U.S. Application Data

(63) Continuation-in-part of application No. 09/286,257, filed on Apr. 5, 1999, which is a continuation-in-part of application No. 08/832,758, filed on Apr. 4, 1997, now Pat. No. 5,943,478.

(51) Int. Cl.[7] ........................................... G06F 13/00
(52) U.S. Cl. ............................... 713/201; 348/10
(58) Field of Search ............................. 348/7, 10; 705/26, 705/27, 39; 713/200, 201, 202; 380/205, 210, 211

(56) References Cited

U.S. PATENT DOCUMENTS

| | | | |
|---|---|---|---|
| 5,550,984 | 8/1996 | Gelb | 395/200.17 |
| 5,590,266 | 12/1996 | Carson et al. | 395/340 |
| 5,699,513 | 12/1997 | Feigen et al. | 395/187.01 |
| 5,960,411 | * 9/1999 | Hartman et al. | 705/26 |
| 6,029,150 | * 2/2000 | Kravitz | 705/39 |

OTHER PUBLICATIONS

DellaFerra et al., "The Zephyr Notification Service," Usenet Conference, Feb. 1988.
Lamacchia, David, "The Flame Client–Based Instantaneous Datagram Communication Substrate" SB Thesis, Massachusetts Institute of Technology, May 1996.

* cited by examiner

Primary Examiner—James P. Trammell
Assistant Examiner—Pierre Eddy Elisca
(74) Attorney, Agent, or Firm—Workman, Nydegger & Seeley

(57) ABSTRACT

A messaging system is described in which subscription requests are transmitted over the Internet using Internet protocols such as extensions of HyperText Transport Protocol (HTTP). The subscription request may be for a wide variety of information from the remote device. For example, the subscription request might be for messages to be forwarded from the device as they are received. Also, the subscriptions could be for messages to be generated when a property value of the remote device has a predetermined characteristic. Such property values might include, for example, stock prices, inventory levels, online status, error codes, heart rates, and the like. The subscription request itself is a data structure representing a subscribe method identification, an address of the device containing the information, and an address of the device to which the information is to be forwarded. Optionally, the subscription request may also define the conditions under which a message is to be forwarded, or under which a property notification is to be sent.

28 Claims, 7 Drawing Sheets

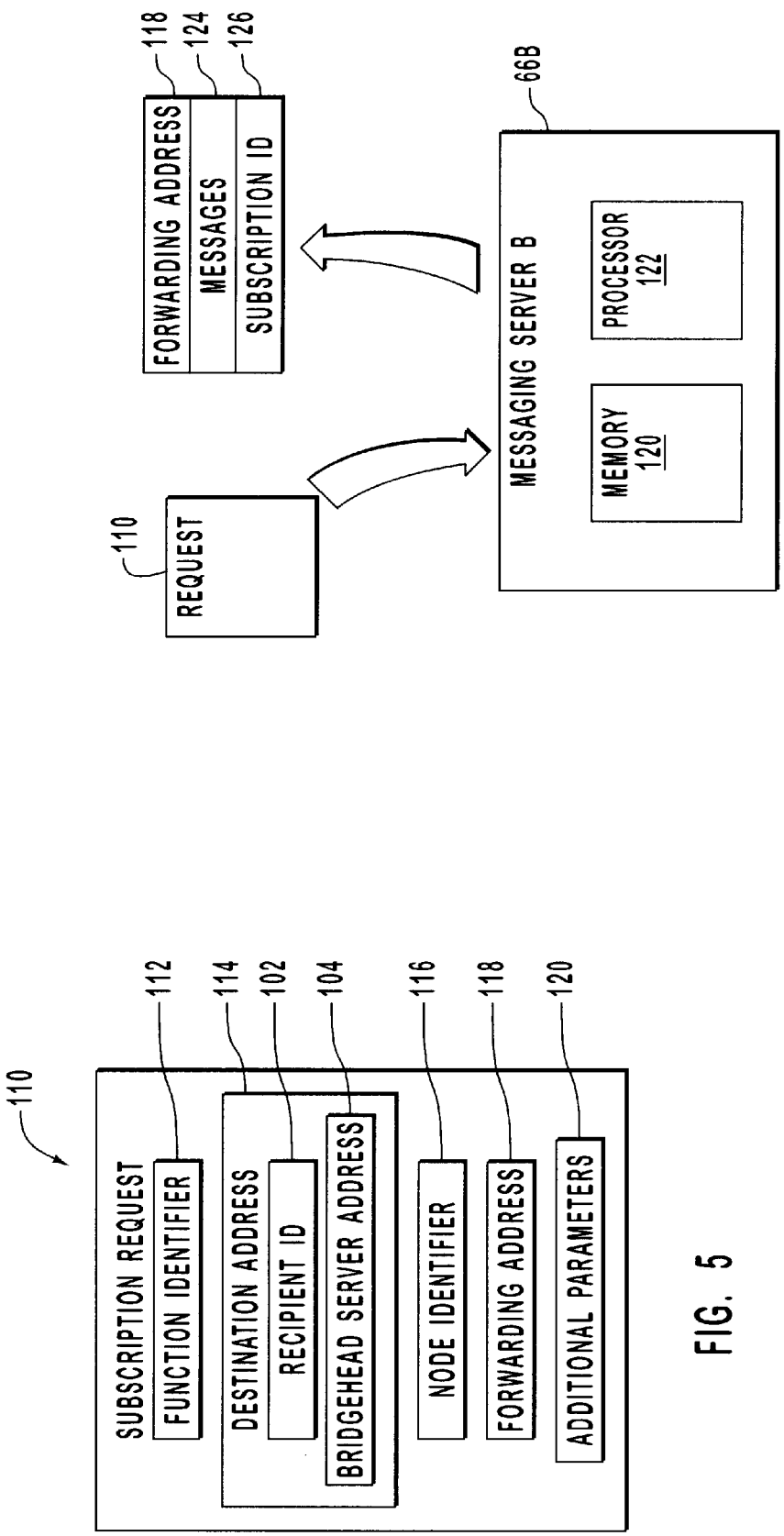

METHODS AND SYSTEMS FOR MESSAGE FORWARDING AND PROPERTY NOTIFICATIONS USING ELECTRONIC SUBSCRIPTIONS

RELATED APPLICATION

This application is a continuation-in-part of U.S. application Ser. No. 09/286,257 entitled "Inter-Enterprise Messaging System Using Bridgehead Servers", filed Apr. 5, 1999, which is incorporated herein by reference. That application is a continuation-in-part of U.S. application Ser. No. 08/832,758, entitled "System for Immediate Popup Messaging Across the Internet," filed Apr. 4, 1997, now U.S. Pat. No. 5,943,478 which is incorporated herein by reference.

BACKGROUND OF THE INVENTION

1. The Field of the Invention

The present invention relates to electronic communications. Specifically, the present invention relates to methods and systems for message forwarding and property notification using electronic subscriptions.

2. The Prior State of the Art

Electronic communication technology has advanced significantly in modern times. Currently, information is commonly exchanged over computer networks. The largest and most far reaching of all computer networks has been termed "the Internet" which links devices worldwide. The Internet is essentially composed of a worldwide network of inter-linked computer servers. Other smaller networks ("intranets") used to link local devices in, for example, a company or organizational environment are termed local area networks (LANs). LANs may also be interconnected to each other over the Internet.

Communication over the Internet can occur in several ways. A sender may send an unsolicited message to the recipient via, for example, e-mail. While such unsolicited e-mail often contains desired information, the e-mail might also contain information that is not desired or not timely. Thus, recipients often generate a request focussed on desired information. For example, a user may use an Internet browser and type in a uniform resource locator (URL) address corresponding to a piece of desired information such as, for example, a stock price residing on a remote server. The user then submits the request over the Internet using a protocol such as HyperText Transport Protocol (HTTP). Upon receiving the request, the remote server transmits the data back to the user's Internet browser.

While the requested information may be desired, the information may still not be timely. After all, the user only periodically checks for the desired information since a request must be generated to check for the desired information. If the user checks for the desired information once every hour, for example, the information may be as much as one hour old before the user again requests updated data. That kind of old data may be useless in many applications. Thus, what was desired is a way of obtaining real-time information over the Internet from remote devices.

One way for a user to obtain information over the Internet from a remote device is to subscribe to information on a device containing Internet broadcasting capability. For instance, a remote server may broadcast information such as stock prices, files and video to a wide number of users over the Internet. One disadvantage of such a system is that the remote system must have expensive and complicated broadcasting capability. There are only a limited number of such systems available. Often, it is desirable to obtain information from a device or server that does not have powerful broadcasting capability.

Buddy lists allow for a user to obtain information, albeit limited to online status, in relative real-time from a remote device. Buddy lists are known in the context of instant messaging systems. Instant messaging requires the tracking of the online status of each user in a buddy list since instant messaging in real-time requires that each correspondent be online. If a correspondent is listed as off-line, users who have the correspondent listed in their buddy list will then know not to waste time trying to engage in a real-time conversation with the off-line correspondent. On the other hand, if the correspondent is online, users who have the correspondent listed in their buddy list will know that they can engage in real-time conversation with the correspondent (assuming the correspondent is willing).

Instant messaging systems do not give any other information about the remote device other that online status. After all, online status is the only information about remote devices that is needed in instant messaging. It is also relatively simple to determine the online status. The buddy lists ping each other at short intervals to see who's online. If the ping is successful, the client reports that your buddy is online and ready to chat. These methods are specifically tailored to determining online status.

In addition to the disadvantage of only providing online status, many instant messaging systems have difficulty communicating through firewalls depending on the firewall characteristics. Firewalls are machines commonly used for enforcing corporate network security policies; most business users connect to the Internet through a firewall. Firewalls represent a significant impediment to real-time communication between Internet users. Firewall designs generally prohibit external entities on the Internet from directly connecting to internal entities protected by the firewall. While such security mechanisms prevent external entities from maliciously manipulating internal entities, they have had the side effect of preventing asynchronous communication to an internal entity.

In light of the above shortfalls, what is desired is a method and system for determining a wide variety of information about a remote device in real-time even if the remote device does not have complicated broadcasting capability, and even if the remote device is on the other side of a firewall.

SUMMARY AND OBJECTS OF THE INVENTION

The present invention relates to messaging systems in which information may be subscribed from one device to another. The subscription requests are transmitted over the Internet using Internet protocols such as extensions of HyperText Transport Protocol (HTTP). The subscription request may be for a wide variety of information from the remote device.

For example, the subscription request might be for messages to be forwarded from the device as they are received. Thus, a user on vacation may have messages forwarded from the user's normal messaging server to the client local to the user. Such a message forwarding subscription request may be generated by and transmitted from the local client or by any other device capable of generating and transmitted the request.

Also, the subscriptions could be for messages to be generated when a property value of the remote device has a predetermined characteristic. The kinds of property values to which a user can subscribe is limited only by the values that the device can measure. For example, stock prices, inventory levels, online status, error codes, heart rates, light levels, typing speed, number of recently visited Internet sites, and any other quantity that may be measured may be subscribed to. A user may subscribe to changes in a stock price residing on a remote server. Furthermore, a user may subscribe to an online status of a remote client to prepare to instant message with that client. A user may also subscribe to error codes on peripheral devices to monitor the peripherals. A doctor may subscribe to a heart rate of a patient in a remote location measured by a remote device. The number of applications of this invention is enormous.

The subscription request itself is a data structure representing a subscribe method identification, an address of the device containing the information, and an address of the device to which the information is to be forwarded. Optionally, the subscription request may also define the conditions under which a message is to be forwarded, or under which a property notification is to be sent. The device that forwards the information need not have complex broadcasting capability. The only things required of the forwarding device is that the device recognizes the subscription request, recognizes the information requested in the subscription request, recognizes the address of the call back device indicated in the request, and forwards the information to the call back device.

Since the subscribe requests can be generated over the Internet to remote devices with minimal preparation of the remote device, there is great flexibility is routing information. For example, newsgroups may be established by a user submitting a message forwarding subscription request to a server for the server to forward messages it receives in a given newsgroup directory to a number of clients. Thus, messages are instantly forwarded to the clients as soon as the message is posted in the newsgroup directory of the server.

The present invention also allows for instant forwarding of the messages and property notification even through firewalls using bridgehead servers as described herein. Messages, whether they be the original subscription request or the message sent in response to such a request, may be addressed to the bridgehead server guarding the network. The message also may include a recipient identifier. Based on this recipient identifier, the message is transmitted from the bridgehead server to the appropriate messaging server within the network.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 5 is a diagram of a subscription request structure in accordance with the invention;

FIG. 6 is a schematic diagram showing the bridgehead server as it responds to the subscription request of FIG. 5.

DETAILED DESCRIPTION OF THE PREFERRED EMBODIMENTS

The present invention relates to methods and systems for subscribing to information from a remote device to have the designated information instantly forwarded to a call back device specified by the subscriber. For instance, while a user is traveling, a user may subscribe to her e-mail messages received at the corporate server associate with her regular office computer. When any change in e-mail status occurs, namely a new message, the new message is instantly forwarded to her hand-held text display or the like. Furthermore, a user may desire to be instantly notified of other property changes in a remote device. For example, a systems administrator may subscribe to an error status for each printer, copier, and scanner within the system. When an error message occurs at any device, the systems administrator is notified at his desk-top computer and thus can take quick action without waiting to be notified by a user. Another user may desired to subscribe to a stock price listed on a remote device. Yet another user may desire to subscribe to an online status to instant message with the remote device. The present invention even works through firewalls.

The invention is described below by using diagrams to illustrate either the structure or processing of embodiments used to implement the systems and methods of the present invention. Using the diagrams in this manner to present the invention should not be construed as limiting of its scope. The embodiments of the present invention may comprise a computer network adapted to perform the functions disclosed herein or a special purpose or general purpose computer including various computer hardware, as discussed in greater detail below.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
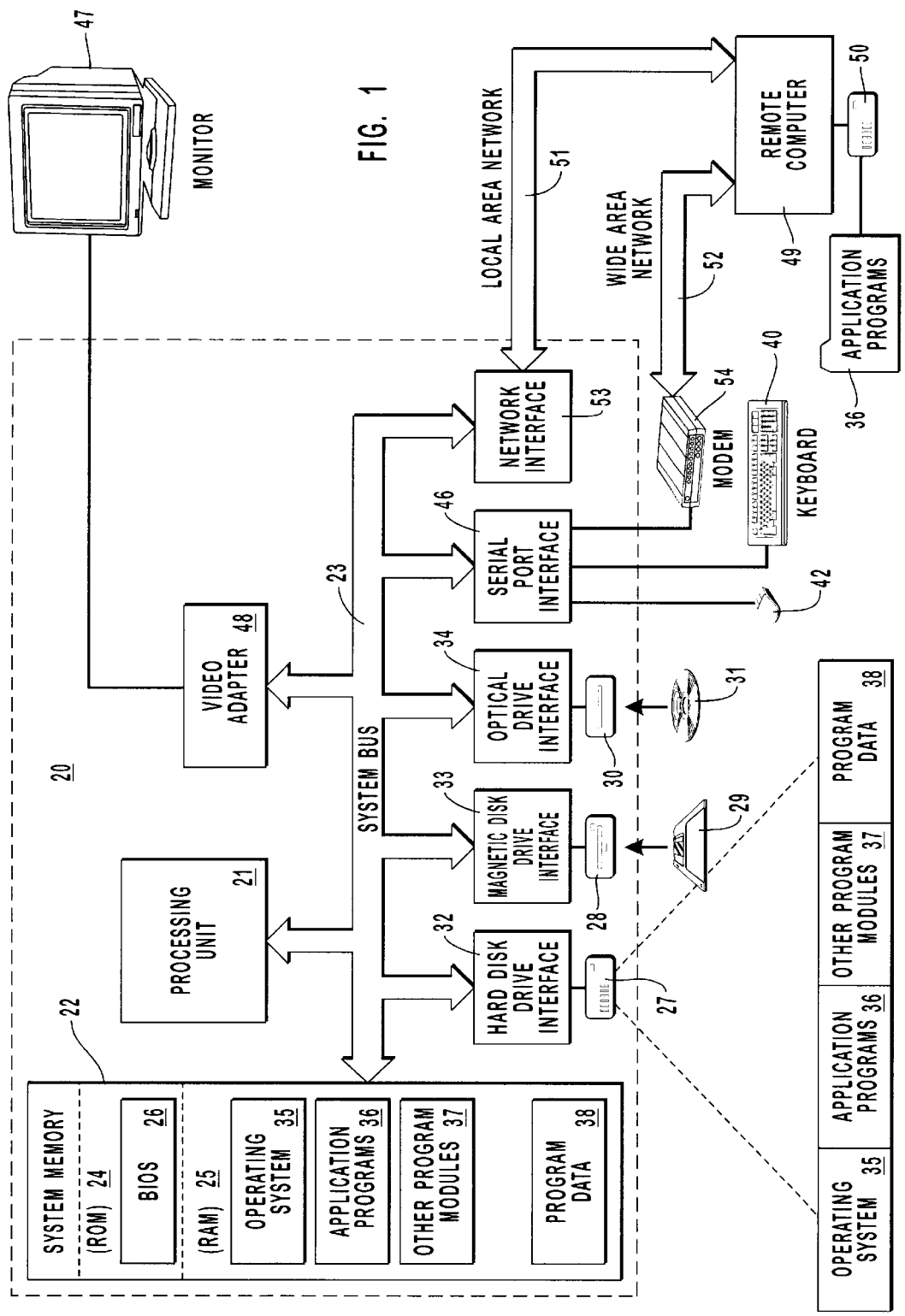
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions., such as program modules, being executed by computers in network environments. Generally, program modules include routines, programs, objects, components, data structures, etc. that perform particular tasks or implement particular abstract data types. Computer-executable instructions associated data structures, and program modules represent examples of the program code means for executing steps and acts of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk, a removable magnetic disk 29 and a removable optical disk 31, other types of computer readable media for storing data can be used, including magnetic cassettes, flash memory cards, digital video disks, Bernoulli cartridges, RAMs, ROMs, and the like.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Message Transmission

Figure 2:
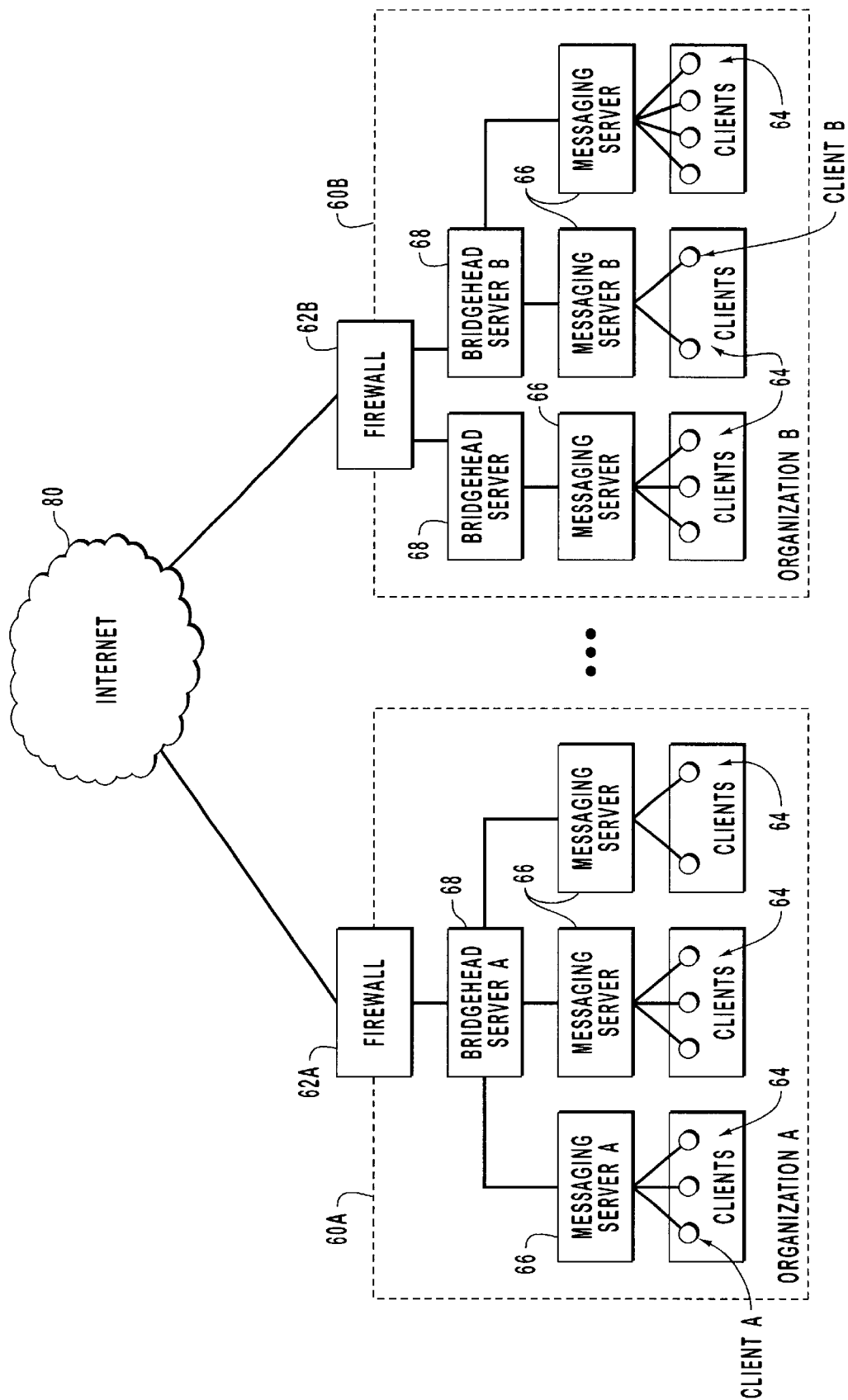
FIG. 2 is a schematic diagram illustrating a suitable network environment, including networks operated by different organizations, in which the invention can be implemented.

FIG. 2 illustrates an exemplary network environment or messaging system in which the invention can be implemented. The general features of the network environment are described. Then, methods and systems for subscribing to information on remote devices are described.

In FIG. 2, organization A administers a network 60A, while organization B administers a network 60B. Networks 60A and 60B each have access to the Internet 80 or another communication network capable of transmitting messages between networks. While only two organizations and their associated networks are illustrated in FIG. 2, the invention is scalable to any number of networks, organizations, or clients.

Network 60A is protected by firewall 62A, while network 60B is protected by firewall 62B. As used herein, the term "firewall" is to be broadly defined. Firewalls are defined to include any network node that controls or restricts the ability of an entity outside the node to communicate with network components inside the node. Firewalls also often restrict the ability of network components inside the firewall from communicating with outside entities. In the network environment of FIG. 2, components residing in network 60A are inside firewall 62A, while other components of FIG. 2 are outside the firewall. Firewalls can be implemented in routers or in general purpose or special purpose computing devices in ways that are understood by those skilled in the art. While FIG. 2 illustrates firewalls 62 being implemented at networks 60A and 60B, the principles disclosed herein can optionally be practiced in the absence of firewalls. For instance, organization B might be an Internet service provider that is not protected by a firewall. In this case, the bridgehead servers in organization B might redirect connecting clients to the appropriate messaging servers instead of forwarding incoming requests.

The line segments connecting various network components in FIG. 2 represent the hierarchical relationships between components, and do not necessarily denote communication paths. Each network 60 includes one or more clients 64 that operate client software for generating, storing and displaying messages and for performing any other desired functions in relation to the messages. Clients 64 can constitute any desired computing or communication device that is capable of generating, storing, or displaying messages. Moreover, the term "clients" extends to any computing or communication device, whether associated with a human user, fully automated, or some combination of human-assisted and automated. In one embodiment in accordance with the present invention, the client automatically generates a message upon the happening of a predetermined event. For example, the client may automatically generate a message including a stock price or other value monitored by the client whenever the value has a predetermined characteristic. The client might also be a vending machine that monitors soda can inventory levels, the vending machine generating a message whenever the soda can inventory drops below a certain level.

Each client 64 is assigned to one of any number of messaging servers 66 that reside in network 60. Messaging servers 66 can be substantially any network server that is capable of distributing messages to clients 64. As shown in FIG. 2, each network 60 can have multiple messaging servers 66, with each messaging server being associated with multiple clients 64. It is also possible to have a client that registers directly to the bridgehead server, foregoing an intermediate messaging server. In this alternative embodiment, the client performs any necessary functions that would otherwise be performed by its messaging server.

In one embodiment, messaging servers 66 monitor the current online status of the 13associated clients 64, manage all communication to and from the clients, and store messages 14 that are intended for the clients but cannot be immediately delivered (e.g., if a recipient client is not online when a message is sent). Each client of messaging server 66 can have a contact list and a subscriber list. The contact list includes all other users that a particular client has designated as "correspondents" that the client wishes to regularly keep in touch with. The subscriber list includes all other clients that have designated the particular client as a correspondent. Contact lists, subscriber lists, and related functions of messaging servers will be described in greater detail herein in reference to FIG. 5.

Each network 60 further includes one or more bridgehead servers 68. The bridgehead servers can also be substantially any network server that is adapted to perform the functions that will be described in greater detail in reference to FIG. 4. Bridgehead servers 68 are exposed through the corresponding firewall 62 in the sense that entities outside the network and outside the firewall can address a message to the bridgehead server and cause the message to be received thereby. Each bridgehead server is associated with a pool of one or more of the messaging servers 66. Moreover, any given messaging server 66 might receive messages from only a single bridgehead server or from multiple bridgehead servers, depending on which pool of messaging servers it is included in and the composition of the associated pool of bridgehead servers. In many cases, all bridgehead servers in an organization are capable of passing messages to all messaging servers.

Figure 3:
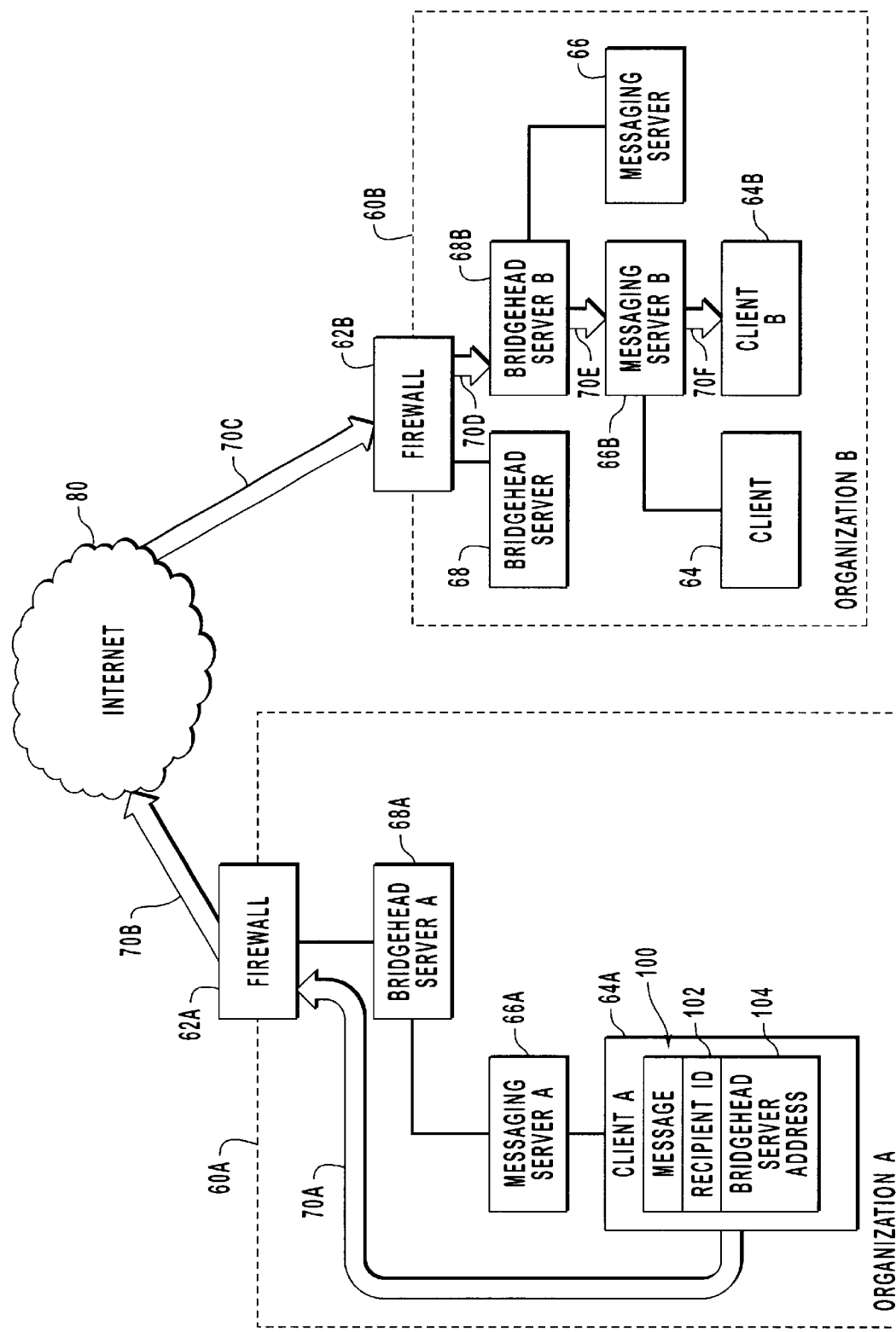
FIG. 3 is a schematic diagram illustrating the route by which a message is transmitted from a sending client to a recipient client in the network environment of FIG. 2 according to one embodiment.

Selected network components of FIG. 2 are designated as client A, messaging server A, bridgehead server A, bridgehead server B, message server B, and client B. These designations are used in FIG. 3 to describe one example of the path of a message as it is transmitted from a sending client to a recipient client. FIG. 3 represents the network environment of FIG. 2, and shows only the network components that are useful in describing the path of the message according to a specific example.

In this example, client A (64A) generates an event-driven message 100, which may be an instant or real-time message, to client B (64B) at organization B This message may be generated by a user entering a message, or the message may be automatically generated by a program such as an on-line status notification program. For purposes of message 100, client A is a sending client, while client B is a recipient client. Any given client can alternately be a sending client as it transmits a message and a recipient client as it receives a message.

As shown in FIG. 3, client B is assigned to messaging server B (66B), and receives messages and, possibly, other network services from messaging server B. Because messaging server B and other messaging servers 66 can provide general network services to their clients, these messaging servers may store proprietary or sensitive information. For this or for other reasons, organization B may be unwilling to allow entities outside firewall 62B to have direct access to messaging server B or any other messaging server 66. This can be one of the principal reasons for which firewall 62B is used by organization B. Moreover, security issues associated with messaging servers 66 and other network servers have been largely responsible for the previous general unavailability of instant messaging over the Internet between organizations.

Bridgehead server B (68B) and other bridgehead servers 68 in the network environment allow real-time messages to be sent to message servers 66 without allowing entities outside the corresponding firewall 62 to directly access the messaging server 66 associated with the recipient client. Moreover, the sending client does not need to know the identity or the address of the messaging server 66 associated with the recipient client. Indeed, the addresses of the messaging servers do not need to be published outside of the firewall.

In the example of FIG. 3, client A composes message 100 and includes therein information 102 identifying recipient client B and the address 104 of a pool of one or more bridgehead servers at network 60B, any of which is capable of distributing messages to client B. Because a "pool" of bridgehead servers can include a single bridgehead server or multiple bridgehead servers, address 104 is accurately described as relating to a pool, regardless of whether there is only one or more than one bridgehead server at network 60B that has the address. In the illustrated example, client A includes a recipient client identifier 102 identifying client B and the address 104 of bridgehead server B in message 100.

Referring to FIG. 2, bridgehead server B serves as a common address for all clients 64 that are linked thereto in the hierarchical structure. From the standpoint of client A, the step of including recipient client identifier 102 and the address 104 of bridgehead server B could merely involve selecting the name of client B from an address book or otherwise addressing message 100 in ways that are easily understood by Internet users. Moreover, recipient client identifier 102 and bridgehead server address 104 can be implemented using conventional Internet resource location protocols that have been adapted to support the invention, and which will be understood by those skilled in the art upon learning of the disclosure made herein.

Turning again to FIG. 3, the path of message 100 as it is transmitted from client A to client B is represented by the directional arrows designated as 70A–F. Message 100 can be directly transmitted from client A to firewall 62A as shown at 70A, bypassing the messaging server A and bridgehead server A that are otherwise associated with client A. Bypassing these network components further reduces transmission latency. Alternately, however, the path of message 100 between client A and firewall 62A can pass through either or both of messaging server A and bridgehead server A.

Message 100 is then transmitted over the Internet 80 to network 60B as shown at 70B and 70C. Bridgehead server B is exposed through firewall 62B in the sense that incoming communication addressed to bridgehead server B is generally authorized to pass through firewall 62B. Thus, message 100 arrives at bridgehead server B through firewall 62B as shown at 70D.

As previously noted, the invention can be practiced in the absence of a firewall 62B at the recipient client's network. In this situation, bridgehead server B can forward messages to the appropriate messaging server 66 as has been described. Alternately, in the absence of a firewall, bridgehead server B can notify the sending client A of a direct address of the recipient client B, thereby enabling client A to directly send messages to client B.

Figure 4:
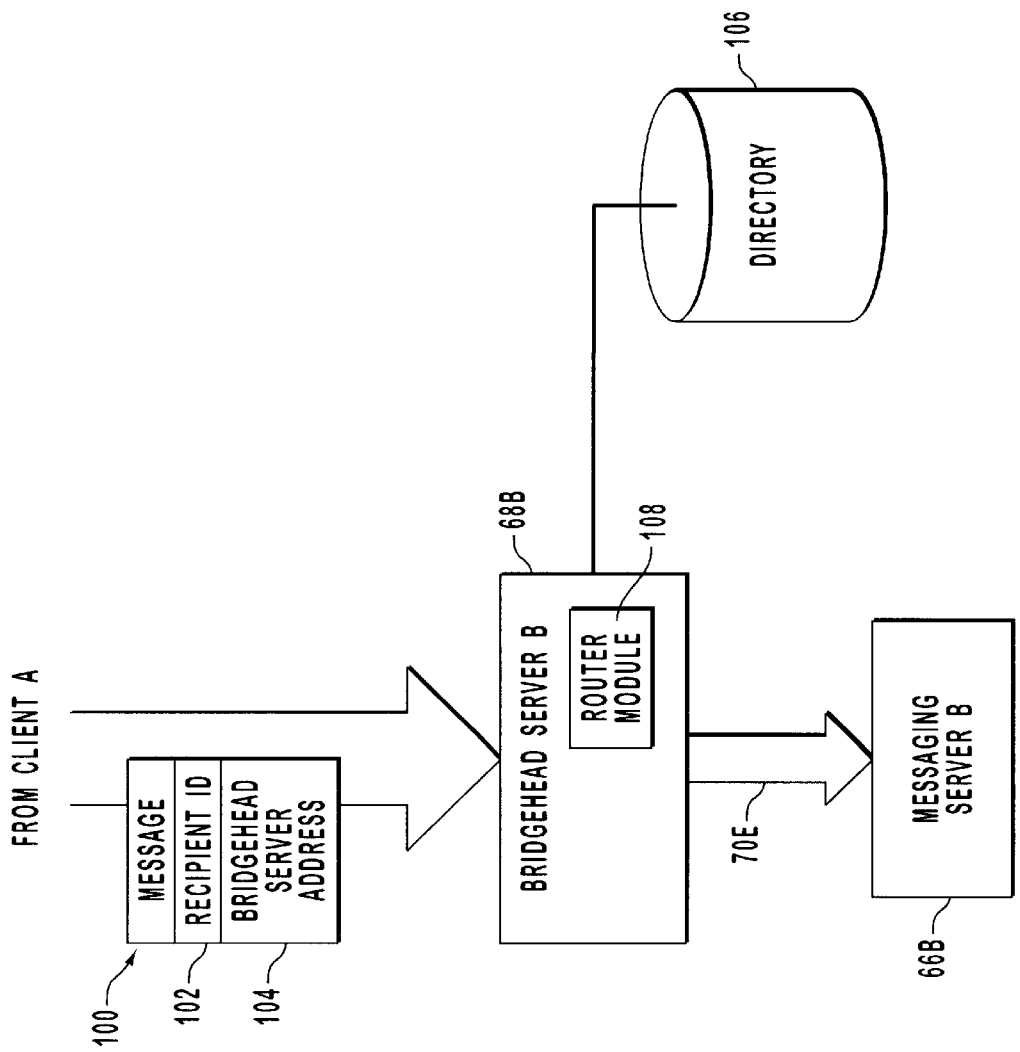
FIG. 4 is a schematic diagram showing a bridgehead server as it resolves the address of a messaging server associated with the recipient client.

FIG. 4 illustrates the processing that is performed at bridgehead server B upon receipt of a message according to one embodiment of the invention. Message 100 includes the recipient identifier 102 and the bridgehead server address 104 that were designated by the sending client. Upon receiving message 100, bridgehead server B resolves the address of messaging server B based, at least in part, on recipient identifier 102. For example, bridgehead server B has a corresponding directory 106 that includes directory information wherein the clients that are associated with bridgehead server B are referenced with the messaging servers to which they are assigned. Thus, bridgehead server B can compare recipient identifier 102 with the directory information included in directory 106, thereby identifying messaging server B as the destination to which message 100 will be forwarded and locating the unique address associated with messaging server B. Once the address of messaging server B has been resolved, a routing module 108 or another component of bridgehead server B causes message 100 to be transmitted to messaging server B as shown at 70E.

Referring again to FIG. 3, messaging server B, having received message 100, transmits the message to client B if client B is online. Because messaging server B may be assigned to multiple clients 64, messaging server B resolves the identity of the recipient client (e.g., client B) using recipient client identifier 102 or by any other desired means. When client B receives message 100, it can open a popup window on the user's screen using standard user interface techniques. For instance, on Windows systems, client B can call functions resident in the Microsoft Foundation Classes (MFC) supplied by Microsoft Corp. of Redmond, Wash., to create a window of a specified size, display it on the screen, overlay it on top of the other applications, and paint the message content as well as some action buttons (e.g. "Done", "Reply", etc.) on the window. Alternately, client B can sound an audible signal or perform any other action to notify the user of message 100 such as, for example, updating a buddy list to reflect a change in online status indicated in the message 100.

Client B can then process message 100 as desired, including possibly sending a response to the message. When client B sends a response to message 100, client B becomes the sending client, while client A becomes the recipient client. The response can be transmitted in substantially the same manner from client B to client A as original message 100 was sent from client A to client B as shown in FIG. 3. In other words, client B composes a message in response to original message 100, includes therein the address of bridgehead server A and a recipient client identifier designating client A as the recipient, and sends the response through the Internet to network 60A. The path of the response can be similar to path 70A–F in that it can bypass message server B and bridgehead server B at network 60B. Transmitting messages and responses in this manner enables clients A and B to engage in two-way, real-time communication through firewalls 62.

Message Forwarding Subscriptions

Methods and systems for subscribing to information from a remote device are now described. The subscription may be for the remote device to generate a message if certain preconditions are met. This type of subscription is termed a "property notification subscription" and will be described in detail further below. The subscription may also be for the remote device to forward any messages that the remote device has received or will receive. This type of subscription is termed a "message forwarding subscription" and is now described in detail in the context of FIG. 3.

Message forwarding subscriptions might best be understood by describing one of its fundamental applications. Suppose that the user at client A named Wanda is traveling and normally works at client B. The user might like to keep apprised of the messages being sent to her normal messaging server B. To accomplish this message forwarding, client A constructs a message 100 that indicates that messages for the user that are at the messaging server B are to be immediately forwarded to client A.

A data structure for such a variation of message 100 is shown in FIG. 5 as a subscription request 110. The subscription request 110 includes a function identifier 112, a destination address 114, an object identifier 116, a forwarding address 118, and possibly additional parameters 120. If the remote forwarding device is disposed within organization B of FIG. 3 as is messaging server B, then the destination address 114 includes the recipient identifier 102 and bridgehead server address 104. Once the subscription message 110 is constructed, the client A then transmits the subscription message 110 to the messaging server B in the manner described above for message 100.

If the remote forwarding device is not disposed behind a firewall, the destination address 114 may be the address of the remote forwarding device itself, rather than that of the bridgehead server. The subscription request 110 may be in the form of an Internet protocol such as HTTP, or an extension thereof, and take generally the following form:

```
SUBSCRIBE [remote forwarding device URL
address]/[object identifier]
    Headers:
        Call-Back: [forwarding URL address]
        Subscription Type: [forward messages,
            property notification]
```

As a specific example, assume that the URL address of the user's normal messaging server (i.e., messaging server B) is http://www.messagingserverB.com, and that the object to which the user's message are sent is http://www.messagingserverB.com/wanda. Assume also that the URL address of the device at which the user is currently located is http://www.clientA.com. In this case, the following might be the subscription request 110:

```
SUBSCRIBE http://www.messagingserverB.com/wanda
    Headers:
        Call-Back: http://www.clientA.com/wandamessages
        Subscription Type: forward messages
```

In this example, "SUBSCRIBE" and "Subscription Type: forward messages" are the function identifier 112 indicating that the message is a message forwarding subscription request. "http://www.messagingserverB.com" is the destination address 114. "/wanda" is the object identifier 116. The Call-Back address has, in this example, a subdirectory identifier "wandamessages" that enables forwarded messages to arrive at a location that will be accessible by wanda. Alternatively, to address through the bridgehead server B, the message forwarding subscription request 110 might be as follows:

```
SUBSCRIBE http://www.bridgeheadserverB.com/wanda
    Headers:
        Call-Back: http://www.clientA.com/wandamessages
        Subscription Type: forward messages
```

In this example, http://www.bridgeheadserverB.com may be viewed as the destination address 114. From client A's viewpoint, "/wanda" is an object identifier 116 of the bridgehead server B and thus the bridgehead server B would be viewed as the forwarding device. In actuality, although transparent to the client A, the bridgehead server B routes the subscription request 110 to the messaging server B that actually forwards the messages.

In both of the above examples, http://www.clientA.com/wandamessages is the forwarding address 118. If the client A exists within a firewall protected by bridgehead server A having an address http://www.bridgeheadserverA.com, the forwarding address 118 might be http://www.bridgeheadserverA.com/clientA/wandamessages. Some types of additional optional parameters 120 will be described further below.

FIG. 6 illustrates the processing that is performed at messaging server B upon receipt of the message forwarding subscription request 110 according to one embodiment of the invention. The destination address 114 (FIG. 5) of the message forwarding subscription request 110 is used to route the message forwarding subscription request 110 to the messaging server B. The forwarding message server B has a memory 120 which has computer executable instructions which, when executed by a processor 122, perform steps now described.

The messaging server B recognizes the subscription request 110 as a message forwarding subscription request by the presence of the function identifier 112 (FIG. 5) indicating such a request. This recognition prompts the messaging server B to check the object identified by the object identifier 116 (i.e., wanda) for messages. The messaging server B sends any messages 124 for the user to the device (i.e., client A) associated with the forwarding address 118 along with a subscription identifier 126.

The messaging server B continues to forward messages as they are received to the forwarding address 118 until the messaging server B receives a messaging forward unsubscribe request along with the subscription identifier 126. The message server B will also stop forwarding messages if the forward message request 110 includes an optional parameter 120 indicating a subscription lifetime. Such a subscription might appear as follows:

```
SUBSCRIBE http://www.messagingserverB.com/wanda
    Headers:
        Call-Back: http://www.clientA.com/wandamessages
        Subscription Lifetime: 3600
        Subscription Type: forward messages
```

In this example, the messaging server B will continue to forward messages for only 3600 seconds (i.e., 1 hour) even without a message forwarding unsubscribe request. In this case, the messaging server B includes computer-executable instructions for terminating the forwarding of messages after the subscription lifetime has elapsed.

The benefit of this limited lifetime feature is that it allows servers to clean out unwanted subscriptions even if the client cannot be trusted to retract the subscription when the client is done with the subscription. This is important since the sending of notification when a subscription is active takes up computer and network resources. If the client wants to retain the subscription, the client must resubscribe periodically.

Figure 7:
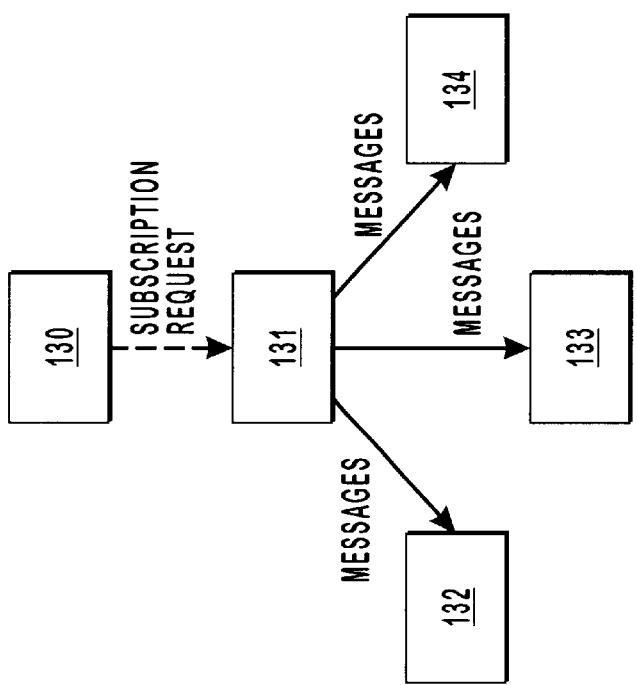
FIG. 7 is a schematic diagram of a newsgroup network being set up by a subscription request.

FIG. 7 illustrates a network of devices 130–134, device 130 having address http://www.130.com, device 131 having address http://www.131.com, device 132 having address http://www. 132.com, device 133 having address http://www. 133.com, and device 134 having address http://www.134.com. As described below, the message forwarding subscription request 110 can forward messages to any device, not just the device at which the user is currently working. Furthermore, multiple subscription requests can be used to establish a group of people that are to receive messages.

In FIG. 7, a user at device 130 can send three subscription requests 110 to device 131 so that device 131 forwards messages from within a object called "/groupmessage" to devices 132, 133 and 134. This may be accomplished by issuing the following subscription requests from the device 130.

```
SUBSCRIBE http://www.131.com/groupmessage
    Headers:
        Call-Back:         http://www.132.com/device132,
                           http://www.133.com/device133,
                           http://www.134.com/device134
        Subscription Type: forward messages
```

Thus, any messages that are posted to the object "groupmessages" at the device 131 are immediately forwarded to the devices 132, 133 and 134. In an alternative embodiment, a subscribe message is issued for each of these three devices 132, 133 and 134.

Property Notification Subscriptions

Property notification subscriptions allow for messages to be generated and forwarded by a remote device when certain triggering conditions are met. The triggering condition may be, for example, a property change associated with the remote device. The properties can be as varied as the online status of the client, the value of a stock, the physical condition of a person monitored with medical equipment, the amount of product with which a vending machine is stocked, or any other measurable condition that might be imagined. Thus, the invention enables event-driven notifications to be instantly communicated from one network to another, even if one or both of the networks are protected by firewalls.

First, an example of a property subscription process for an online status is described. Next, the subscription process for other sample properties is described. Subscribing to the online status of another client is useful in the context of instant messaging. If a recipient client is online, the recipient can promptly read and respond to messages, thereby allowing real-time communication to be established over the Internet between clients at different networks and organizations. Notification of changes in the online status of clients can be communicated from one network to another in substantially the same manner as the other instant messages disclosed herein. Specifically, the notification can be sent to a bridgehead server at the recipient's network, and is then appropriately forwarded to the recipient according to the methods disclosed herein in reference to message transmission.

Figure 8:
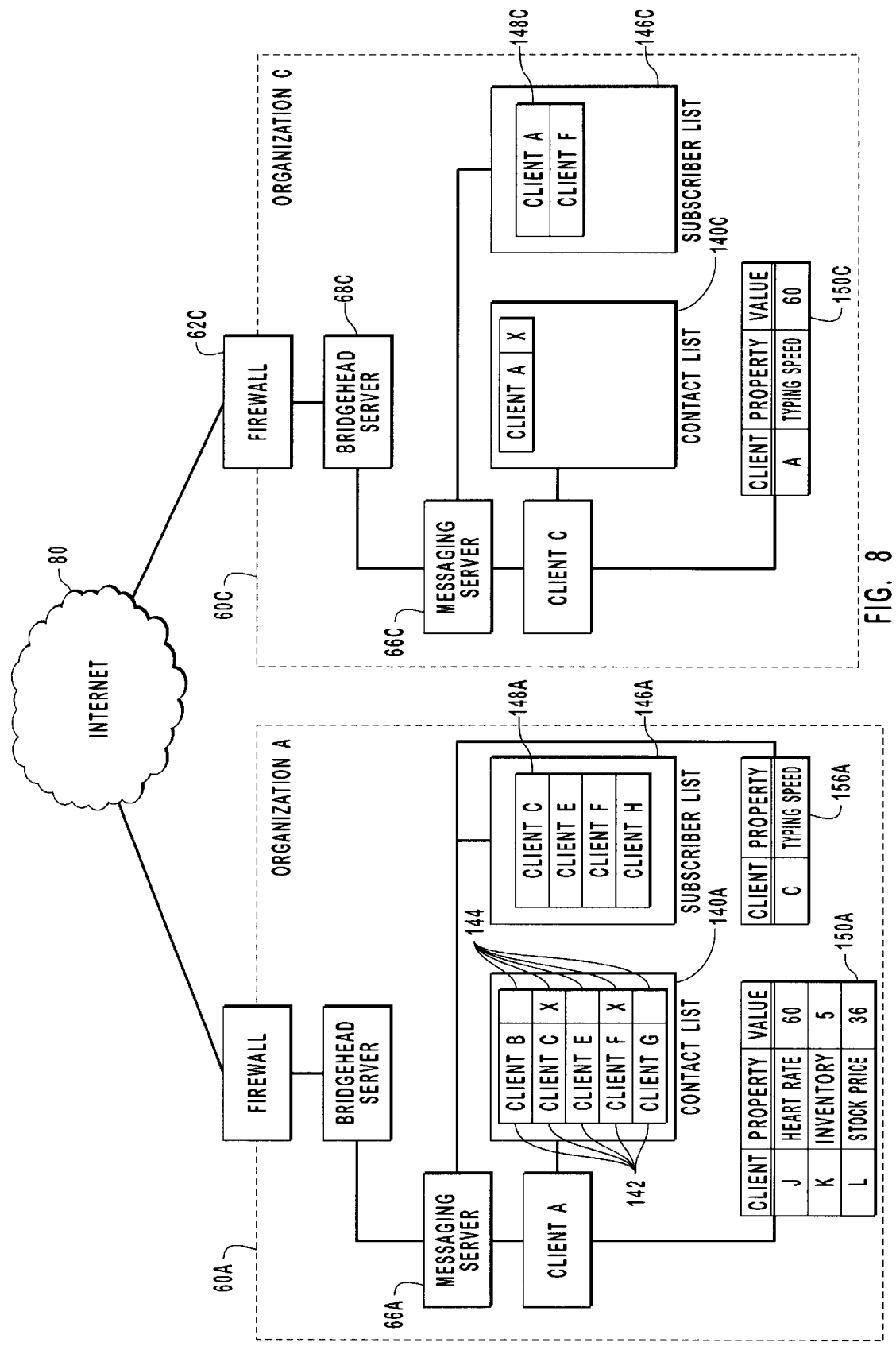
FIG. 8 is a schematic diagram depicting one embodiment of a system for maintaining contact lists showing the online status and other property values of clients in the networked environment.

Referring to FIG. 8, contact lists 140 having online statuses are akin to a phone book that is initially empty and gradually accumulates contact information for associated clients. For instance, as client A corresponds with other clients or as client A decides to add a correspondent to contact list 140A, entries 142 are added to the contact list 140A. In this example, client A has designated clients B, C, E, F, and G as correspondents, and corresponding entries 142 have been added to contact list 140A. These clients can be associated with the same messaging server or the same bridgehead server as client A, or instead may reside at a different network than client A. Client C resides at network 60C administered by organization C, while the other clients, namely clients B, E, F, G, and H, are not illustrated in FIG. 8.

Each entry 142 is associated with an online status property 144, the value of which indicates whether the correspondent is online. For instance, in FIG. 8, client entries 142 of contact list 140A designating clients C and F have an online status property value 144 indicating that the clients are online (as indicated by the "x"). In contrast, client entries 142 that designate clients B, E, and G have an online status property value 144 indicating that these clients are not online (as indicated by the absence of an "x"). By referring to online statuses of contact list 140A, the user of client A can immediately know whether particular correspondents are online and therefore available to engage in real-time communication over the Internet or any other network such as a private corporate LAN. Although the entry 142 is described as indicating an on-line status, the entry 142 may even have other status values such as "away", "busy", "idle", "on the phone" and so forth.

The values of online properties 144 are set in cooperation with a subscriber list managed by the messaging server associated with the clients designated by client entries 142 and the online status property For example, subscriber list 146C associated with client C has an entry 148C indicating that client A has subscribed to the online status property of client C (because client A has designated client C as a correspondent). Entry 148C is used by messaging server 66C to notify messaging server 66A each time the online status property of client C changes (because client C logs on or logs off)thereby allowing client A to update its contact list 140A. Similarly, client C has designated client A as a correspondent in its contact list 140C. Accordingly, subscriber list 146A includes an entry 148A indicating that client C has subscribed to the online status property of client A.

When a client logs on to its messaging server, the messaging server refers to the subscriber list associated with the client to determine which other clients have designated the client as a correspondent. In the example of FIG. 8, client A logs on to messaging server 66A. Messaging server 66A then refers to subscriber list 146A and finds that client C has subscribed to the online status property of client A. Messaging server 66A then sends notification of the online status of client A to messaging server 66C by way of bridgehead server 68C. The notification is sent through firewall 62C to bridgehead server 68C in a similar fashion as messages (e.g., message 100 of FIG. 4) are sent to a bridgehead server. Moreover, bridgehead server 68C resolves the address of messaging server 66C according to the address resolution techniques disclosed herein. In this manner, messaging server 66A can notify messaging server 66C of the online status of client A over the Internet and through firewall 62C without having to know the identity or address of messaging server 66C. The entry associated with client A at contact list 140C is updated to show that client A is logged on to its messaging server. When client A logs off or otherwise is disconnected from message server 66A, message server 66A sends notification of this event to messaging server 66C by way of bridgehead server 68C. The online status of client A can thereby be communicated or continuously displayed to the user of client C such that the user of client C knows when client A is available to engage in real-time communication Subscriber list 146C can be used in a like manner to update the online status of client C at contact list 140A.

Although an actual notification may be sent to client A (or to the server of client C) to indicate that client C has logged off as described above, sometimes client C may be disconnected from the message without such a message being sent. In one embodiment, when client C logs on, client C sends an event notification to client A (or the server of client C) indicating that client C has logged on, but indicating if client C does not send client A (or the server of client C) an acknowledgement signal within a predetermined time period, then client A (or the server of client C) should register client C as being offline. In this case, client C periodically sends notifications to client A (or client C) registering client C as being online. Thus, if client C is disconnected and an event notification indicating that client C is off-line is not dispatched to client A (or the server of client C), client C will be registered as being offline.

The contact list entries 142 can be created by the user of the associated client as desired as the user designates clients as correspondents. Alternately, an entry 142 can be created for a recipient client each time the client sends a message to a new recipient client. In either case, after being initially added to a contact list, entries 142 remain on the list unless explicitly removed by the client. Thus, the contact list can be persistent through logoffs and subsequent logins. The location of contact lists 140 and subscriber lists 146 is not critical. For example, while contact lists 140A and 140C are illustrated in FIG. 8 as being located at clients A and C, respectively, the contact lists can instead be stored at another network location.

The subscriber lists 146 are generated by each of the clients in the list sending a property notification subscribe request 110 to the corresponding client A. The property notification subscription request 110 is structured as shown in FIG. 5. For example, in order to be placed in the subscriber list 146A of client A, client C (or any other device) may have sent the following subscribe request to the messaging server A:

```
SUBSCRIBE http://www.messagingserverA.com/clientA
    Headers:
        Call-Back: http://www.messagingserverB.com/clientC
        Subscription Type: property notification
        Property Condition: online status change
        Message Content: onlinestatus
```

Here, "Property Condition: online status change" is an additional parameter 120 which indicates the condition that must occur before the online status property notification is generated and transmitted to the call-back address. "Message Content: onlinestatus" is also an additional parameter 120 that indicates that the message content includes whether the client C is online. "Subscription Type: property notify" means that the request command is for the device to send the message content to the call-back address whenever the property condition occurs.

The subscription process for properties other than the online status is now described. In accordance with the present invention, client A may be notified of any desired property condition of any device to which client A is given security access. The number of properties and devices to which client A can subscribe is enormous. All that is necessary is that client A be able to send a subscribe message to the device, that the device measures or otherwise has notice of the value of the property desired, that client A properly addresses the object having the desired property, and that the device can send messages about the property to client A.

For example, suppose that the notification device is a health monitor (e.g., at http://www.healthmonitor.com) monitoring various aspects of a patient's health. A property of the heart monitor might be the patient's heart rate (at object http://www.healthmonitor.com/heartrate), and a target device might be a doctor's text pager (at http://www.massgeneral.gov/gooddoctorpager). The property event that might trigger a property notification might be simply a change in the property value. For example, every time the patient's heart rate changes, the doctor is instantly notified of the change. An example of a subscription message 110 that might accomplish this is as follows:

```
SUBSCRIBE http://www.healthmonitor.com/heartrate
    Headers:
        Call-Back: http://www.massgeneral.gov/gooddoctorpager
        Subscription Type: property notification
        Property Condition: heartrate change
        Message Content: heartrate
```

The headers of the above SUBSCRIBE command may also include the format of the property notification. For example, the user at client A may just want a number indicating beats per minute.

The property event that would trigger a property notification might also be that the heart rate has another predetermined characteristic such as the heart rate falling outside of a given safe range. Thus, a doctor can be notified quickly when the patient's health or life is in jeopardy. An example of a subscription message 110 that might accomplish this is as follows:

```
SUBSCRIBE http://www.healthmonitor.com/heartrate
    Headers:
        Call-Back: http://www.massgeneral.gov/gooddoctorpager
        Subscription Type: property notify
        Property Condition: heartrate < 40 or
            Heartrate > 150
        Message Content: "ALERT, Unsafe Heart Rate"
```

Here, the health monitor sends a message "ALERT, Unsafe Heart Rate" to the doctor's text pager when the health monitor measures or otherwise has notice of a heart rate less than 40 or greater than 150.

FIG. 8 shows that Client A has a property contact list 150A identifying the client (left column), the property (middle column), and the property value (right column). For example, client A subscribes to the heart rate measured by the health monitor (client J) which has a value of 60. Client A also subscribes to the inventory level of client K, an automated soda machine, which has 5 cans in it. Client A also subscribes to a stock price monitored by Client L, which indicates a price of 36. Client A could also subscribe to any quantity measurable by other clients as desired. Client A may also be capable of measuring quantities such as typing speed per minute. In that case, client C has subscribed to the typing speed measured by client A as indicated in the property contact list 150C. Client A also has a property subscriber list 156A indicating that client C has subscribed to the typing speed measured by client A. Clients B, C, E, F, G, H, J, K and L may also have similar property subscription lists and property subscriber lists to keep track of the property notifications that should be sent.

Thus, the present invention enables subscriptions to property conditions and messages present at remote devices without requiring complex and complicated broadcasting software. Furthermore, these subscriptions are enabled whether or not one or both of the devices is behind a firewall.

Figure 9:
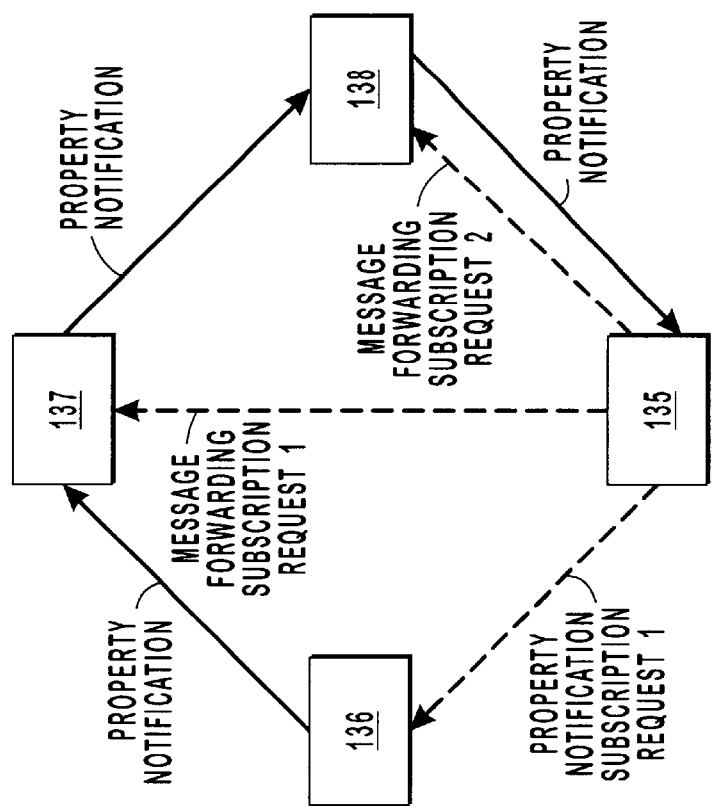
FIG. 9 is a schematic diagram of a network in which a property notification is uniquely routed in response to a series of subscription requests.

The present invention also allows great flexibility in routing property notifications and other electronic messages as illustrated in FIG. 9. The example of FIG. 9 represents one of an essentially unlimited number of network and device configurations through which property notifications and other electronic messages may be routed. Device 135 issues three subscription requests resulting in a property notification message being routed from device 136, through device 137, through device 138, and to device 135. To accomplish this, device 135 issues a property notification subscription request to device 136 resulting in device 136 transmitting a property notification message to the device 137 according to methods described above. The device 135 also issues a message forwarding subscription request to the device 137 causing the device 137 to forwarding messages, including the property notification message, to the device 138. The device 135 also issues another message forwarding subscription request to the device 138 causing the device 138 to forward messages, including the property notification message, to the device 135.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a first device that is included in a network system that also includes a second device, the first device being capable of monitoring the value of a property at the first device, a method of transmitting a message from the first device to the second device when the value of the property at the first device experiences a specified conditions so that the second device is notified that the value of the property has experienced the specified condition, the method comprising the acts of:

receiving a subscription request from the second device, the subscription request specifying:
the property to which the second device is subscribing; and
a condition associated with the value of the property, wherein the subscription request represents a request for the first device to generate a message when the value of the specified property at the first device experiences the specified condition;

in response to receiving the subscription request, monitoring the value of the specified property at the first device, resulting in the first device making a determination that the value of the specified property has experienced the specified condition;

upon the first device making the determination, generating a message that includes information identifying the value of the specified property at the first device; and transmitting the message from the first device to the second device, such that the second device is notified that the value of the property has experienced the specified condition.

2. The method of claim 1, wherein the act of receiving the subscription request from the second device comprises the following act of:

receiving the subscription request over the Internet from the second device using an extension of HyperText Transport Protocol (HTTP).

3. The method of claim 1, wherein the act of monitoring the value of the specified property comprises act of:

monitoring the value of the specified property for a predetermined time period and upon the completion of the time period ceasing monitoring the value of the specified property.

4. The method of claim 1, wherein the message is a first message, the method further comprising the following act of:

generating a message forwarding subscription request to be sent to the second device from a third device so as to result in, when the messaging forwarding subscription request is received at the second device, a second message being sent from the second device to a third device when the second device receives the first message.

5. The method of claim 1, wherein the act of monitoring the value of the specified property comprises monitoring when an online status value of the property at the first device changes.

6. The method of claim 1, wherein the value of the property comprises
a value selected from the group consisting of a stock price value, a heart rate value, and an inventory value.

7. The method of claim 1, wherein the subscription request is a first subscription request, wherein the message is a first message, the method further comprising the following act:

generating a second subscription request so as to result in, when the second subscription request is received at the second device, a second electronic message being sent from the second device to a third device when the second device receives the first electronic message.

8. The method of claim 1, wherein the subscription request is a first subscription request, wherein the message is a first electronic message, the method further comprising the following step:

generating a second subscription request so as to result in, when the second subscription request is received at the second device, a second electronic message having the same content as the first electronic message being sent from the second device to a third device when the second device receives the first electronic message.

9. The method of claim 1, wherein the subscription request is a first subscription request, wherein the message is a first electronic message, the method further comprising the following step:

generating a second subscription request so as to result in, when the second subscription request is received at the first device, a second electronic message having the same content as the first electronic message being sent from the first device to at least one other device upon the happening of the specified condition.

10. In a first device that is included in a network system that also includes a second device, the first device being capable of monitoring receipt of an electronic mail message at the first device, a method of transmitting the electronic mail message from the first device to the second device when the electronic mail message is received by the first device so that the electronic mail message is automatically forwarded to the second device, the method comprising the acts of:

receiving a subscription request from the second device, the subscription request specifying:
the first device to which the second device is subscribing; and
a condition associated with the electronic mail message, wherein the subscription request represents a request for the first device to forward the electronic mail message from the first device upon the first device experiencing the specified condition;

in response to receiving the subscription request, monitoring the receipt of the electronic mail message at the first device, resulting in the first device making a determination that the first device has experienced the specified condition;

upon the first device making the determination, transmitting the electronic mail message from the first device to the second device, such that the second device is notified that the first device has experienced the specified condition.

11. The method of claim 10, wherein the act of receiving the subscription request from the second device comprises the act of receiving the subscription request over the Internet from the second device using an extension of HyperText Transport Protocol (HTTP).

12. The method of claim 10, wherein the act of receiving the subscription request from the second device comprises the act of receiving the subscription request over the Internet from the second device using an HyperText Transport Protocol (HTTP).

13. The method of claim 10, wherein the specified condition comprises receiving the electronic mail message at the first device.

14. The method of claim 10, wherein the subscription request is a message forwarding subscription request so as to result in, when the first device receives the message forwarding subscription request, the electronic mail message that was originally addressed to the first device being forwarded from the first device to the second device as the first device receives the electronic mail message.

15. The method of claim 10, wherein the act of monitoring the receipt of the electronic mail message comprises the act of monitoring the receipt of the electronic mail message for a predetermined time period and upon the completion of the time period ceasing monitoring the receipt of the electronic mail message.

16. The method of claim 15, wherein upon completion of the time period, ceasing to forward the electronic mail message received at the first device to the second device.

17. The method of claim 15, wherein the subscription request comprises a subscription lifetime defining the time period that the first device monitors receiving the electronic mail message.

18. The method of claim 10, wherein the electronic mail message is a first electronic mail message, the method further comprising the act of:

generating a message forwarding subscription request so as to result in, when the message forwarding subscription request is received by the second device, a second electronic mail message being send from the second device to at least one other device when the second device receives the first electronic mail message.

19. The method of claim 18, wherein the second electronic mail message is the same as the first electronic mail message.

20. A computer product for implementing, in a system that includes a first device and a second device, the first device being capable of monitoring the value of a property at the first device, a method of transmitting a message from the first device to the second device when the value of the property at the first device experiences a specified conditions so that the second device is notified that the value of the property has experienced the specified condition, the computer program product comprising:

a computer readable medium carrying computer-executable instructions for implementing the method, wherein the computer-executable instructions, when executed by the system, cause the system to perform the acts of:

receiving a subscription request from the second device, the subscription request specifying:

the property to which the second device is subscribing; and a condition associated with the value of the property, wherein the subscription request represents a request for the first device to generate a message when the value of the specified property at the first device experiences the specified condition;

in response to receiving the subscription request, monitoring the value of the specified property at the first device, resulting in the first device making a determination that the value of the specified property has experienced the specified condition;

upon the first device making the determination, generating a message that includes information identifying the value of the specified property at the first device; and transmitting the message from the first device to the second device, such that the second device is notified that the value of the property has experienced the specified condition.

21. The computer product of claim 20, wherein the act of receiving the subscription request from the second device comprises the following act of:

receiving the subscription request over the Internet from the second device using an extension of HyperText Transport Protocol (HTTP).

22. The computer product of claim 21, wherein the act of monitoring the value of the specified property comprises the act of:

monitoring the value of the specified property for a predetermined time period and upon the completion of the time period ceasing monitoring the value of the specified property.

23. The computer product of claim 21, wherein the message is a first message, the method further comprising the following act of:

generating a message forwarding subscription request to be sent to the second device from a third device so as to result in, when the messaging forwarding subscription request is received at the second device, a second message being sent from the second device to a third device when the second device receives the first message.

24. The computer product of claim 21, wherein the act of monitoring the value of the specified property comprises monitoring when an online status value of the property at the first device changes.

25. The computer product of claim 21, wherein the value of the property comprises a value selected from the group consisting of a stock price value, a heart rate value, and an inventory value.

26. The computer product of claim 21, wherein the subscription request is a first subscription request, wherein the message is a first message, the method further comprising the following act:

generating a second subscription request so as to result in, when the second subscription request is received at the second device, a second electronic message being sent from the second device to a third device when the second device receives the first electronic message.

27. The computer product of claim 21, wherein the subscription request is a first subscription request, wherein the message is a first electronic message, the method further comprising the following step:

generating a second subscription request so as to result in, when the second subscription request is received at the second device, a second electronic message having the same content as the first electronic message being sent from the second device to a third device when the second device receives the first electronic message.

28. The computer product of claim 21, wherein the subscription request is a first subscription request, wherein the message is a first electronic message, the method further comprising the following step:

generating a second subscription request so as to result in, when the second subscription request is received at the first device, a second electronic message having the same content as the first electronic message being sent from the first device to at least one other device upon the happening of the specified condition.

* * * * *

UNITED STATES PATENT AND TRADEMARK OFFICE
CERTIFICATE OF CORRECTION

PATENT NO. : 6,260,148 B1
DATED : July 10, 2001
INVENTOR(S) : Stephen G. Perlman; Phillip Y. Goldman It is certified that error appears in the above-identified patent and that said Letters Patent is hereby corrected as shown below:

Column 4,
Line 47, after "WebTV™" delete [lm]
Line 50, after "WebTV™" delete [lm]

Column 6,
Line 27, after "based" insert -- on --

Column 7,
Line 14, change "well6 known" to -- well-known --
Line 37, change "selects" to -- select --

Signed and Sealed this

Twelfth Day of March, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,260,148 B1
DATED : July 10, 2001
INVENTOR(S) : Sudhanshu M. Aggarwal, Peter L. Beebee, Rajeev Surati, Leon C. W. Wong, and Martin R. Calsyn It is certified that error appears in the above-identified patent and that said Letters Patent is hereby corrected as shown below:

Column 2,
Line 19, change "that" to -- than --
Line 63, change "transmitted" to -- transmitting --

Column 5,
Line 26, change "instructions." to -- instructions --
Line 31, change "instructions" to -- instructions, --

Column 7,
Line 64, after "messages" delete [14]

Column 14,
Line 18, change "property" to -- property. --
Line 25, after "logs off)" insert -- , --

Column 16,
Line 52, after "150C" insert -- . --

Column 19,
Line 48, change "send" to -- sent --

Signed and Sealed this

Second Day of April, 2002

Attest:

*Attesting Officer*

JAMES E. ROGAN
*Director of the United States Patent and Trademark Office*